United States Patent [19]

Lin et al.

[11] Patent Number: 4,793,264
[45] Date of Patent: Dec. 27, 1988

[54] LOW CORROSION IMPULSE INK JET INK CONTAINING ANTI-OXIDANT

[75] Inventors: An-Chung R. Lin, New Town, Conn.; Richard G. Whitfield, Kalamazoo, Mich.

[73] Assignee: Dataproducts Corporation, Woodland Hills, Calif.

[21] Appl. No.: 37,062

[22] Filed: Apr. 13, 1987

Related U.S. Application Data

[63] Continuation of Ser. No. 672,587, Nov. 16, 1984, abandoned, which is a continuation-in-part of Ser. No. 522,837, Aug. 12, 1983, Pat. No. 4,537,631, which is a continuation of Ser. No. 327,994, Dec. 7, 1981, Pat. No. 4,400,215.

[51] Int. Cl.$^4$ ............................................. C09D 11/02
[52] U.S. Cl. ....................................... 106/22; 106/27; 106/20
[58] Field of Search ......................................... 106/22

[56] References Cited

U.S. PATENT DOCUMENTS

| | | | |
|---|---|---|---|
| 2,426,248 | 8/1947 | Sugarman | 106/23 |
| 3,282,709 | 11/1966 | Ehrhardt et al. | 106/27 |
| 3,382,088 | 5/1968 | Noda | 106/27 |
| 3,994,736 | 11/1976 | Hertz et al. | 106/22 |
| 4,005,237 | 1/1977 | Panken | 428/195 |
| 4,038,297 | 7/1977 | Rodenberg et al. | 106/27 |
| 4,069,179 | 1/1978 | Jones | 106/27 |
| 4,165,399 | 8/1979 | Germonprez | 427/264 |
| 4,176,361 | 12/1979 | Kawada et al. | 346/1.1 |
| 4,197,135 | 4/1980 | Bailey | 106/23 |
| 4,243,994 | 1/1981 | Kobayashi et al. | 346/140 |
| 4,248,746 | 2/1981 | Greiner | 260/23 |
| 4,250,512 | 2/1981 | Kattner et al. | 346/140 |
| 4,273,847 | 6/1981 | Lennon et al. | 430/106.6 |
| 4,279,653 | 7/1981 | Makishima et al. | 106/22 |
| 4,281,329 | 7/1981 | Yano et al. | 346/1.1 |
| 4,312,009 | 1/1982 | Lange | 346/140 |
| 4,332,946 | 6/1982 | Uehara | 546/208 |
| 4,337,183 | 6/1982 | Santiago | 524/446 |
| 4,343,653 | 8/1982 | Beach | 106/22 |
| 4,353,078 | 10/1982 | Lee et al. | 346/140 |
| 4,361,843 | 11/1982 | Cooke et al. | 106/22 |
| 4,386,961 | 6/1983 | Lin | 106/22 |
| 4,390,369 | 6/1983 | Merritt et al. | 106/31 |
| 4,400,215 | 8/1983 | Cooke et al. | 106/22 |
| 4,409,040 | 10/1983 | Tabayashi et al. | 106/20 |
| 4,421,559 | 12/1983 | Owatari | 106/20 |
| 4,426,227 | 1/1984 | Keeling et al. | 106/27 |
| 4,443,820 | 4/1984 | Mutoh et al. | 358/296 |
| 4,475,113 | 10/1984 | Lee et al. | 346/1.1 |
| 4,489,099 | 12/1984 | Shaheen et al. | 426/3 |
| 4,490,731 | 12/1984 | Vaught | 346/140 R |
| 4,531,976 | 7/1985 | Lin | 106/27 |
| 4,537,631 | 8/1985 | Cooke et al. | 106/22 |

FOREIGN PATENT DOCUMENTS

| | | |
|---|---|---|
| 147257A | 7/1985 | European Pat. Off. |
| 2101864 | 7/1972 | Fed. Rep. of Germany |
| 2441478 | 3/1975 | Fed. Rep. of Germany |
| 2753816 | 6/1978 | Fed. Rep. of Germany |
| 132543 | 11/1973 | Japan |
| 50-084311 | 7/1975 | Japan |
| 55-54368 | 4/1980 | Japan |
| 55468 | 1/1981 | Japan |
| 113462 | 9/1981 | Japan |
| 56-166274 | 12/1981 | Japan |

OTHER PUBLICATIONS

Lundberg's "Autoxidation and Antioxidants," vol. 1, (Interscience, 1961), pp. 32–35 and 156–157.
Abstract No. 89298X/48 "Ink Compsns for Ink Injection Type Recording Appts—Prepared by Dissolving or Dispersing Oil Soluble Dye Dissolved in Liquid Fatty Acid in Aromatic Hydrocarbon Opt. Contg. Nonionic Surfactant".
Abstract of Jap. Serial No. 77/17,758 "Magnetic Ink-Jet Printing Process".
Abstract No. 107587 "Inks for Ink-Jet Recording".
Abstract No. 06955B/04 "Oily Ink Compsn. for Stamping, Recording, Jet Printing, etc.—Can be Used on Plastic, Glass, Metal, Wood, etc. Is Not Sticky and Has Good Water Resistance".
Abstract No. 43987C/27 "Non-Impact Recording Process—By Forming Images or Recording Substrate Using Water or Oil Based Ink Applying Toner to Images and Fixing Toner".
Abstract No. 45784 C/26 "Quick Drying Ink for Ink Jet Recording—Contains Oil-Soluble Dyes, Alcohol-Amine(s) and Polyvalent Alcohol Derivs".
Abstract No. 47097C/27 "Quick Drying Ink for Ink Jet Recording—Comprises Oil-Soluble Dye, Alcohol Amine and Volatile Polar Solvent".
Japanese Abstract No. 56-113462(A).
Owens, "New Ink-Writing Methods For Graphic Re-
(List continued on next page.)

*Primary Examiner*—A. Lionel Clingman
*Attorney, Agent, or Firm*—Woodcock Washburn Kurtz Mackiewicz & Norris

[57] ABSTRACT

A novel impulse ink jet ink for use with an ink jet system having material subject to corrosion by said ink is disclosed. The subject ink comprises a fatty acid vehicle, a colorant, and amounts of anti-oxidant, preferably an alkylated hydroquinone, which are effective to substantially reduce the rate of corrosion on metallic parts of the system. The preferred anti-oxidant, which comprises 0.1–5 wt % of the ink, is an alkylated hydroquinone, particularly butylated hydroquinone. The subject ink preferably comprises an oleic acid vehicle, and a vehicle additive selected from the group consisting of aromatic alcohols, aromatic ethers, dimethylsulfoxides, alkyl pyrrolidones, methoxy- and ethoxy- triglycols, aliphatic ketones, and mixtures thereof. The corrosive nature of such inks is potentiated by the relatively high percentages of the vehicle-soluble dyes in the ink. Such dyes are present in amounts up to 20 wt % of the ink.

2 Claims, No Drawings

OTHER PUBLICATIONS cording" Instruments & Control Systems, vol. 38, pp. 100–102, Jul. 1965.

Hendricks, "Ink Splitter for Hot Melt Ink," IBM Technical Disclosure Bulletin, vol. 28, No. 3A, pp. 947–948, Aug. 1983.

Sweet, Richard G., "High Frequency Oscillography With Electrostatic Deflected Ink Jets", Stanford Electronics, Ltd., Technical Report No. 1722-1, Mar., 1964.

Willett, Abstract No. 86-009196/02 "Application of Thermoplastic Composition of Wax and/or Resin Medium—Using Non-Contact Ink Jet Printing Apparatus and Improving Definition, Adhesion and Resistance to Smuding".

Abstract 702458/39 "Ink for Hot Ink Jet Recording Process—Contains Recording Component Decomposing at Temp. Well Above b.pt. of Solvent or Dispersion Medium".

Abstract No. 169865-EG "Hot Melt Electrostatic Printing Ink".

Abstract No. J55145-774 "Low Softening Point Ink for Ink-Jet Recording Contains Water Soluble Dye, Polyhydric Alcohol & Aliphatic Monohydric Alcohol".

Abstract No. 800333 "Recording Medium for Ink Jet Recording Process Comprises Colourant, Solvent and a Substance that Liberates a Vapour When Heated".

Abstract No. 35067C/20 "Ink Jet Recording Head—With Heating Element At Junction of Liquid Inlet and Inclined Expulsion Zone".

LOW CORROSION IMPULSE INK JET INK CONTAINING ANTI-OXIDANT

CROSS REFERENCE TO RELATED APPLICATIONS

This is a continuation of application Ser. No. 672,587, filed Nov. 16, 1984, now abandoned, which is a continuation-in-part of U.S. patent application Ser. No. 522,837, filed Aug. 12, 1983, now U.S. Pat. No. 4,537,631, issued Aug. 27, 1985, which in turn is a continuation of U.S. patent application Ser. No. 327,994, filed Dec. 7, 1981, now U.S. Pat. No. 4,400,215 which patents are assigned to the assignee of the present application, and which are hereby incorporated by reference.

The present application is related to U.S. patent application Ser. No. 331,604, filed Dec. 17, 1981, entitled "Natural Wax-Containing Ink Jet Inks", now U.S. Pat. No. 4,390,369, and its continuation Ser. No. 507,918, filed June 27, 1983, which are assigned to assignee of the present application, and hereby incorporated by reference.

The present application is also related to U.S. patent application Ser. No. 248,551, filed Mar. 27, 1981, now U.S. Pat. No. 4,361,843, entitled "Improved Ink Jet Compositions And Method", which is also assigned to the assignee of the present application, and is also hereby incorporated by reference.

The present application is further related to U.S. Ser. No. 327,994, filed Dec. 7, 1981, now U.S. Pat. No. 4,400,215, entitled "Improved Ink Jet Formulation For Reduced Start-Up Problems", and its continuation applications U.S. Ser. No. 522,837, filed Aug. 12, 1983, which patent and application are assigned to the assignee of the present application, and which are hereby incorporated by reference.

The present application is further related to U.S. patent application Ser. No. 394,154, filed July 1, 1982, entitled "Stearic Acid Containing Ink Jet Inks", now abandoned, and its continuation application Ser. No. 565,124, filed Dec. 23, 1983, which applications are assigned to the assignee of present application, and are hereby incorporated by reference.

The present application is also related to Ser. No. 331,603, filed Dec. 17, 1981, entitled "Heterologous Ink Jet Ink Compositions", now U.S. Pat. No. 4,386,961, and its continuation application Ser. No. 501,074, filed June 6, 1983, which patent and application are assigned to the assignee of the present application, and are hereby incorporated by reference.

The present application is further related to U.S. patent application Ser. No. 644,542, filed Aug. 27, 1984, entitled "High Molecular Weight, Hot Melt Impulse Ink Jet Ink", which application is hereby incorporated by reference.

BACKGROUND OF THE INVENTION

The present invention relates to the field of impulse ink jet inks, and more particularly to the field of impulse ink jet inks for use in impulse ink jet systems having metallic materials which are in contact with and subject to corrosion by such inks.

A wide variety of impulse ink jet inks have been suggested. As disclosed in the aforementioned related patents and patent applications, these inks may comprise a wide variety of materials including fatty acids, such as oleic acids; a wide variety of colorants, including many dyes and several pigments; and solvents and solvent additives including aromatic alcohols, aromatic ethers, dimethylsulfoxides, alkyl pyrrolidones, methoxy- and ethoxy- triglycols, and aliphatic ketones, and in particular n-methyl pyrrolidone, benzyl alcohol, benzyl ether, diethylene glycol, methoxy triglycol, and mixtures thereof.

In addition to the above, other practitioners in the art have suggested the use of various materials in inks, including inks intended for certain types of ink jet printing. In U.S. Pat. No. 4,197,135 (Bailey et al.), inks are disclosed containing a water soluble dye and a polyamine containing 7 or more nitrogen atoms per molecule which is said to improve the water-fastness of inks to be used in ink jet printing. Bailey et al. further discloses that the additives of his invention are to be distinguished from the polyethyleneemines of the prior art in that none of the emine functionalities are primary in order to avoid an azo dye composition reaction, which requirement may be met by synthesis of peralkyl or perhydroxyalkyl substituted polyethylene amines. The preferred polyamines are disclosed as having the hydrogen of the primary amine group replaced with either a methyl or a hydroxyethyl group.

In U.S. Pat. No. 4,343,653 (Beach et al.), jet inks are disclosed comprising sulfur black 1 dyes, the solublizing groups of which have been oxidized, as for example through the use of hydrogen peroxide.

In U.S. Pat. No. 4,382,946, entitled "Ink Composition For Ink-Jet Recording" (Uehara et al.), an ink having an aqueous solution comprising a water soluble acid or direct dye or mixtures thereof is disclosed which further comprises a compound selected from the class of polyhydric alcohols having 1-6 carbon atoms, hexylene glycol, triethylene glycol, di-propylene glycol and 1,2,6-hexanetriol.

U.S. Pat. No. 4,409,040 (Tabayashi et al.) discloses a wide variety of ink jet inks including those containing a variety of solubilizing or wetting agents. In particular, Tabayashi suggests an ink comprising a solution in water of a water-soluble dye, a wetting agent and polyethylene glycol phenol ether or its derivatives. Examples of the disclosd wetting agent including polyhydric alcohols such as ethylene glycol, diethylene glycol, glycerol, triethylene glycol, tetraethylene glycol, polyethylene glycols, polypropylene glycol, pyrrolidones including n-methyl pyrrolidone and beta-hydroxyethylpyrrolidone, low molecular weight alkyleneimines such as polyethyleneimine and polypropyleneimine; aminoalcohols such as monoethanolamine, diethanolamine, triethanolamine, N,N-dimethylethanolamine and aminoethylethanolamine and amides such as formamide and N,N-dimethylformamide.

Additional patents of interest in this area include U.S. Pat. Nos. 3,282,853, (Bennett); 4,108,671 (Richlin); 4,136,076 (Daniels); 4,150,997 (Hayes); 4,153,467 (Yano); and 4,279,653 (Makishima et al.). In U.S. Pat. No. 4,279,653, (Makishima et al.), an ink composition for ink jet recording is disclosed consisting essentially of a water-soluble wetting agent, water, a water-soluble dye and an "oxygen absorber". Makishima teaches that where amounts of dissolved air in ink is large, the higher the frequency of repetition of increase of pressure, "the more the ink comes to have properties as a compressible fluid and the more the transfer of increase of the pressure is delayed". Accordingly, Makishima teaches the desirability of maintaining amounts of dissolved air at a very low level. Physical or chemical methods for removing dissolved oxyge are thus suggested, which include reacting the oxygen dissolved in an ink with oxygen absorbing compounds including metals such as iron chips; sulfites such as sodium sulfite, ammonium sulfite, potassium sulfite, sodium hydrogen sulfite; potassium hydrogen sulfite and ammonium hydrogen sulfite, polyhydric phenols such as pyrogallol, and other reducing agents such as sodium trithionite and hydrazine.

Notwithstanding the numerous inks suggested for use in ink jet printing, a need remains to provide ink jet inks which are readily jettable by impulse ink jet systems, which produce high quality prints, and which exhibit superior material compatibilities. The selection of materials used in an ink jet printing system is very crucial to its reliability and performance. The interaction between ink and hardware is a primary concern when selecting materials for hardware or ink.

Most ink jet hardware consists of two major classes of material, metal and polymer. The failure of metal is usually caused by corrosion, while polymeric failure is generally the result of the failure of mechanical properties such as swelling, embrittleness, softness and disintegration.

Applicants have recognized that metal-corrosion can be predicted by electrochemical experiments such as potentiostatic measurement or by weight loss. The corrosion of metal is caused by the transfer of electric charge. Since water can ionize dye and salt impurities, aqueous inks have higher electric conductivity than non-aqueous inks. Hence, aqueous inks are generally more corrosive. Applicants have found that corrosion is seldom caused by the ink vehicle alone, except for a few high ionization polar solvents such as acids or amines.

SUMMARY OF THE INVENTION

The present invention provides non-water based inks and ink jet systems wherein chemical additives are used to overcome ink-metal corrosion problems. In particular, the novel impulse ink jet ink of the present invention comprises a fatty acid vehicle, a colorant, and amounts of an anti-oxidant which are effective to substantially reduce the rate of ink induced metallic corrosion. The preferred anti-oxidant, which comprises 0.1-5, preferably 0.5-5, more preferably 1-5 wt % of the subject ink, is an alkylated hydroquinone, such as a tertiary butyl hydroquinone.

It has been found that the use of such anti-oxidants is capable of reducing the corrosion rate of nickel to less than one eighth of that of the ink without additives. This effect is particularly important in ink jet inks containing relatively high concentrations of high purity dyes.

Accordingly, a primary object of the present invention is the provision of an improved impulse ink jet ink for use with an ink jet system having materials subject to corrosion by said ink.

A further object of the present invention is the provision of a novel impulse ink jet system exhibiting reduced rates of corrosion.

These and other objects of the present invention will become apparent from the following more detailed description.

DESCRIPTION OF THE PREFERRED EMBODIMENTS

The present invention provides a novel impulse ink jet ink for use with an ink jet system having materials which are subject to corrosion by said ink. The subject impulse ink jet system therefore comprises an ink delivery means for supplying ink to an impulse ink jet head, said means comprising metal surfaces in contact with the ink to be jetted which are subject to corrosion thereby. The preferred ink for use in this system comprises at least one fatty acid, a dye and an anti-oxidant present in amounts sufficient to substantially reduce the rate of corrosion of the metal surfaces by said ink. In the subject system, the preferred metal surfaces are nickel or nickel-alloy surfaces which are subject to substantial ink reduced corrosion.

The inks of the present invention generally comprise a medium to high molecular weight naturally occurring fatty acid vehicle, such as a $C_8$-$C_{26}$ fatty acid vehicle, preferably oleic acid. This vehicle comprises 10 to 97 wt % of the subject ink.

The preferred inks further comprise 10–90 wt % of a vehicle additive selected from the group consisting of aromatic alcohols, aromatic ethers, dimethylsulfoxides, alkyl pyrrolidones, methoxy- and ethoxy- triglycols, polyethylene glycols, aliphatic ketones and mixtures thereof. The preferred vehicle additives may be selected from a group consisting of n-methyl pyrrolidone, benzyl alcohol, benzyl ether, methoxy triglycol, diethylene glycol, and mixtures thereof.

The preferred inks also comprise 3–20, preferably 10–17, more preferably 15 wt % of one or more vehicle-soluble dyes. The preferred dyes include chinoline yellow, nigrosine base, Acetosol brown, Orasol black, and oil yellow. Mixtures of one part Acetosol brown to two parts Orasol black are currently preferred to provide a suitable "black" ink.

Inks of the present invention further comprise effective amounts of anti-oxidant(s) to substantially reduce the rate of corrosion of the ink on the metallic parts of the ink jet system which are in contact with such ink. As used herein, a "substantial reduction" in the rate of corrosion is defined as a reduction of at least 10% of the corrosion rate which otherwise occurs using the same ink without the addition of anti-oxidant. In accordance with the present invention, the anti-oxidant comprises 0.5, preferably 1-4 wt % of the ink. The results of the use of the preferred anti-oxidant, butylated hydroquinone, in an ink consisting of 37.5 wt % diethylene glycol, 37.5 wt % methoxy triglycol, 10% oleic acid, 5% Acetosol brown, and 10% Orasol black RL is shown in the following table. This test was conducted using a test coupon of nickel 3 inches by ¼ inch, and by measuring the amount of weight lost by that coupon, over periods of 3-6 days at 100° C.

ADDITIVE IMPROVEMENT ON NICKEL CORROSION

| Additive Concentration | Weight Loss ($10^{-3}$ g/cm$^2$/day at 100° C. |
|---|---|
| 0% | 2.61 |
| 1% | 0.83 |
| 3% | 0.18 |
| 5% | 0.05 |

As seen from the Table, improvements in corrosion resistance and reductions in corrosion rate are exhibited which are proportional with additive concentration. The effects on corrosion rate of the subject ink will, of course, depend to a large extent upon the susceptibility of given metal materials to corrosion by that ink. Many stainless steels exhibit little or no corrosion even at moderately elevated temperatures. On the other hand, the corrosion rate of brass is many time that of nickel. Furthermore, the relative corrosion rates of nickel parts may depend upon a variety of factors including whether that nickel is electroformed (showing a higher corrosion rate) or rough (showing the same or somewhat lower corrosion rate, depending upon the type of ink employed).

As seen from the above, the present application provides a novel ink jet ink and system which substantially reduce the rate of corrosive attack of the ink on corrosion-susceptible metal components.

We claim:

1. An impulse ink jet system comprising:
    (a) an impulse ink jet comprising 10–97 weight percent of at least one $C_8$–$C_{26}$ fatty acid, 3–20 weight percent dye and 10–90 weight percent solvent additive selected from the group consisting of aromatic alcohols, aromatic ethers, dimethyl sulfoxides, alkyl pyrrolidones, methoxy- and ethoxy-triglycols, polyethylene glycols, aliphatic ketones, and mixtures thereof; and
    (b) an ink delivery means for supplying ink to an impulse ink jet head, said means comprising metal surfaces in contact with said ink and subject to corrosion thereby;
    said ink further comprising 0.1–5 weight percent anti-oxidant in amounts sufficient to reduce the rate of corrosion of said metal surfaces by said ink by at least 10% as compared to the rate of corrosion of said ink without said anti-oxidant.

2. The system of claim 1 wherein said metal surfaces comprise nickel surfaces.

* * * * *